UNITED STATES PATENT OFFICE.

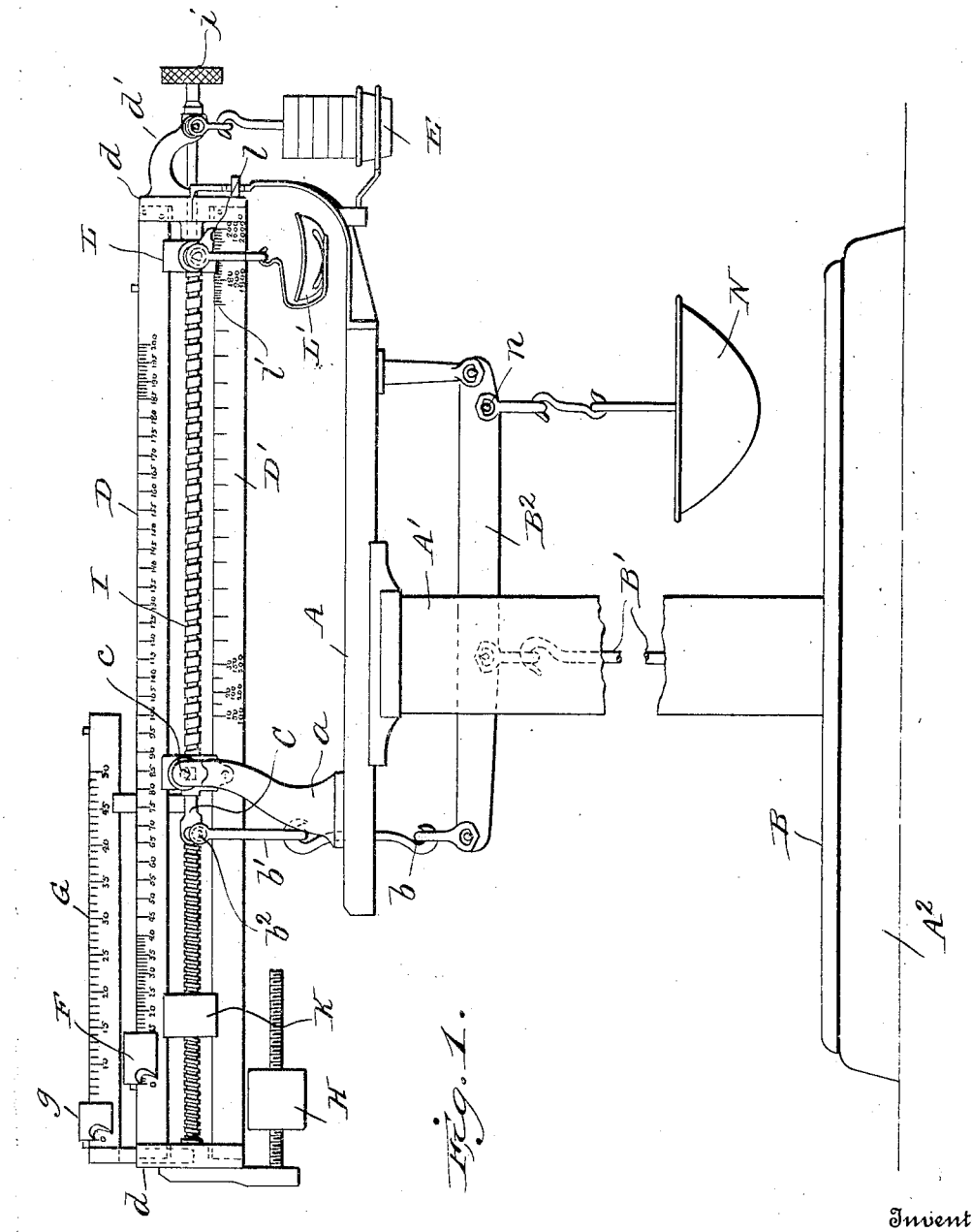

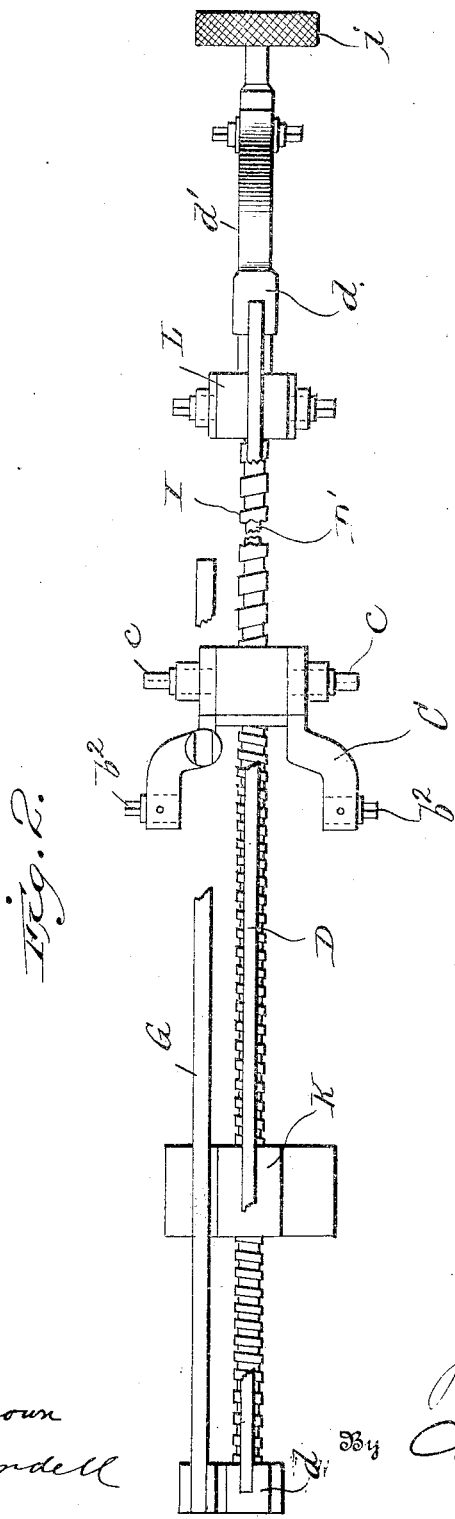

JOSEPH HOPKINSON, OF DAYTON, OHIO, ASSIGNOR TO THE COMPUTING SCALE COMPANY, OF DAYTON, OHIO, A CORPORATION OF OHIO.

WEIGHING AND COUNTING SCALE.

1,110,282.  Specification of Letters Patent.  Patented Sept. 8, 1914.

Application filed March 4, 1912. Serial No. 681,330.

*To all whom it may concern:*

Be it known that I, JOSEPH HOPKINSON, a citizen of the United States, residing at Dayton, in the county of Montgomery and State of Ohio, have invented certain new and useful Improvements in Weighing and Counting Scales; and I do hereby declare the following to be a full, clear, and exact description of the same, reference being had to the accompanying drawings, forming part of this specification, and to the figures and letters of reference marked thereon.

The object of the present invention is to provide a machine by which the weight of articles may be ascertained with accuracy, and which machine shall have the capacity of indicating accurately the number of articles in a given bulk, where said articles are of similar weight, or for determining accurately when a desired number of articles have been placed on or in the receiver of the machine, whereby the necessity of counting the individual objects is entirely obviated.

Like other scales of known construction, the present machine embodies a beam having thereon a movable receiver in or on which one or a definite number of articles may be placed, to form a counterbalance weight, and a load receiver such as a pan or platform connected with the beam through lever and draft rod connections and adapted to receive the articles to be counterbalanced by the beam and its counterbalance weight.

In accordance with the present invention, the beam is provided with a manually controlled operating mechanism embodying a threaded shaft, whereby the counterbalance weight receiver may be moved longitudinally of the beam to any desired position of adjustment and simultaneously a balance weight may be moved in an opposite direction from the axis of the beam in order to neutralize the leverage effect of the counterbalance weight receiver.

Referring to the accompanying drawings,—Figure 1 is an elevation of a weighing and counting machine embodying the present improvement, with portions broken away; and Fig. 2 is a partial top plan view of the beam and associated parts with portions broken away to show underlying parts.

Like letters in the several figures indicate the same parts.

As shown in the accompanying drawings, the machine embodies a head A, supported by a standard A' from a base $A^2$. Upon the base there is supported, through lever connections commonly employed in an ordinary platform scale, a platform B, and extending up through the standard is a draft rod B' pivotally connected at its upper end with an intermediate lever $B^2$ suspended at one end from the head A, and at the opposite end connected through links $b$ and a U-shaped yoke $b'$ with knife edges $b^2$ carried by a beam yoke C. The beam yoke C is provided with laterally projecting knife edge journals $c$ mounted in bearings on the upwardly extending arms $a$ of the head A. The beam, which is rigid with the beam yoke C, preferably embodies parallel top and bottom bars D and D', respectively, extending on opposite sides of the axis formed by the knife edges $c$, and at their ends connected rigidly by end pieces, such as $d$, one of said end pieces having a goose neck $d'$ from which the counterpoise cup E is suspended, as is usual in weighing scale construction.

The beam bar D is graduated in pounds and ounces, as usual, and provided with a slide poise F. Parallel with said bar D, and preferably located above and in rear thereof, is a tare beam G having a poise $g$ thereon, while below both of the bars D and D' at the shorter end there is located the usual gravity or balance ball H.

Journaled in the beam, preferably between and parallel with the two bars D D' is a long screw-threaded shaft I, having an extended end provided with a knurled knob or handle $i$, whereby the shaft may be rotated manually in one direction or the other. The ends of the shaft I on opposite sides of the axis of the beam are provided with screw threads of opposite inclination; that is to say, at one end the thread is a right hand thread, and at the other end a left hand thread, and said threads are of different pitch, the thread on the right hand or longer end being preferably of long pitch, while the thread on the shorter or left hand end is of a short pitch. Conveniently, the right hand end is threaded at a pitch which is just double that of the left hand end and consequently an object moved by the thread on one end of the shaft will travel for a given angular movement of the shaft a distance which is twice as great as the object moved by the thread on the opposite end of the shaft. On the left hand end of the beam and coöperating with the threads of the shaft is a sliding balance weight K, and on the right hand end of the beam and coöperating with the threaded shaft is a sliding carriage L. From the knife edges on the carriage L there is suspended a counterweight receiver L′, and said carriage is provided with a pointer or indicating edge $l$ adapted to register with graduations $l'$ on the bar D′ of the beam.

Rows of computations are associated with the graduations $l'$, and these computations indicate the number of articles on the load receiver of the scale in multiples of the number of articles of similar weight placed in the counterpoise weight receiver L′. The result is that the number of computations and the multiple capacity of the scale is only limited by the size and strength of the parts, but a convenient arrangement is that shown in the drawings, wherein the longitudinal graduations with which the edge $l$ registers indicate one unit in the first or top row of computations extending longitudinally of the beam, five units in the second row of computations and ten units in the bottom row of computations. For example, if one nut or bolt be placed in the counterpoise weight receiver L′, the position of the indicator $l$ will show the number of similar articles which must be placed on the platform or goods receiver to balance the scale. If the pointer $l$ stands in the position shown in the drawings, and the scale is in balance, 200 of the articles will be found on the platform or goods receiver. If five of the articles are placed in the counterbalance weight receiver L′, the second row of computations is read, and in the position of the pointer shown in the drawings, 1,000 of such articles will be on the platform when the scale is in balance. If ten of the articles are placed in the counterpoise weight receiver L′, the bottom row of computations is read, and in the position indicated 2,000 of the articles will be on the platform when the scale is in balance.

The adjustment of the carriage L is effected by the handle $i$, and such adjustment automatically moves the balance weight K toward or from the axis of the beam in exact accord with, but in an opposite direction from the movement of the carriage. The weight of the carriage and parts thereon and of the balance weight K, it will be understood, are so related that the movement does not affect the balance of the beam, and therefore the weight of the articles placed in the counterbalance receiver L′ is the true counterbalancing weight.

In order to increase the capacity of the scale without complication, it is preferred to provide it with means whereby a definite number of articles may be weighed out or segregated without the necessity of any adjustment, and for this purpose the intermediate lever B² is provided with a pendent goods receiver N supported on knife edges $n$ on the lever, and the position of the knife edges $n$ with relation to the axis of the lever is such that the desired number of articles placed in the goods receiver N will be counterbalanced by a single one of the articles placed on the counterpoise balance cup E. For example, in the scale shown, a single article placed on the counterpoise balance cup E will exactly balance 144 articles placed in the goods receiver N, thus providing a convenient arrangement for weighing out or counting articles by the gross. While the supplemental goods receiver N may, as above indicated, be positioned at any point on the intermediate lever, its position remains fixed, as does also the position of the counterpoise balance cup E, and the relation must therefore be established and fixed during the construction of the scale.

Obviously the scale may be used either to determine the number of articles in a given bulk or for counting out a desired number of articles from a bulk. In the first instance, the articles, the number of which is to be determined, are placed on the platform or load receiver, and one, five or, ten of such articles, as the case may be, placed in the counterpoise weight receiver L′. By means of the handle the carriage L is then moved until the beam is in balance and the indicator $l$ will show at once the number of articles on the platform. To count out a desired number of articles, the carriage is first adjusted to the desired indication and then, one, five or ten of the articles, as the case may be, placed in the counterbalance receiver L′. Then articles are placed on the platform until the beam is in balance.

The scale is particularly effective and useful in counting out all small articles of uniform weight, such, for instance, as nuts, bolts, washers, screws and other commodities which are sold by number rather than by weight. By combining the counting with the weighing beam the usefulness of the scale is extended, inasmuch as it may be used primarily as a weighing scale or as a counting scale, or for first determining the weight and then counting the number of articles. For example, a number of articles may be counted out, and then the weight determined, without altering any adjustment further than to remove the counterbalancing articles from the receiver L′ and advancing the weighing poise F until the beam is in balance.

Having thus described my invention, what I claim as new and desire to secure by Letters Patent of the United States, is:

A counting and weighing scale comprising a platform, a draft rod extending upwardly from said platform, an intermediate lever to which said draft rod is pivotally connected, a pivoted beam, a link connecting said pivoted beam and intermediate lever, the pivotal axis of the beam and link connection being fixed with relation to each other, and said beam embodying a bar graduated to indicate weight, a sliding weight indicating counterpoise on said bar, a bar graduated in multiples of articles to be counted, a carriage movably mounted on the beam to register with the last named graduations, a receiver for articles to be employed as a counter weight, suspended from the carriage, a balance weight for the carriage and receiver mounted on the beam on the opposite side of the beam axis, operating connections intermediate the carriage and its balance weight whereby they are moved simultaneously toward and from the beam axis in opposite directions to maintain the balance of the scale, a counterpoise cup suspended from the end of the beam on which said carriage is mounted, and a supplemental receiver for articles to be counted suspended from the intermediate lever.

JOSEPH HOPKINSON.

Witnesses:
JAMES L. BOURNE,
AMELIA WILKIE.